United States Patent [19]

Davidow

[11] Patent Number: 4,813,302
[45] Date of Patent: Mar. 21, 1989

[54] SPEED CHANGING MECHANISM

[76] Inventor: Robert P. Davidow, 8900 Footstep Court, Annandale, Va. 22003

[21] Appl. No.: 44,004

[22] Filed: Apr. 29, 1987

[51] Int. Cl.[4] .......................... F16H 3/22; F16H 3/34; F16H 1/12; F16H 1/20

[52] U.S. Cl. ....................................... 74/351; 74/354; 74/416; 280/238

[58] Field of Search ................ 74/344, 345, 351, 354, 74/384, 393, 396, 415, 416; 474/58, 69, 72; 280/236, 238, 260

[56] References Cited

U.S. PATENT DOCUMENTS

| | | | |
|---|---|---|---|
| 536,550 | 3/1895 | Snyder | 74/351 |
| 649,878 | 5/1900 | Scharbach | 74/351 |
| 978,877 | 12/1910 | Grimes | 74/351 |
| 1,606,012 | 11/1926 | Wilson | 74/351 |
| 2,378,634 | 6/1945 | Hussey | 74/351 |
| 2,561,960 | 7/1951 | Weaver | 74/351 |
| 2,630,021 | 3/1953 | Levin | 74/351 |
| 2,780,110 | 2/1957 | Kopa | 74/351 |

FOREIGN PATENT DOCUMENTS

| | | | |
|---|---|---|---|
| 0018034 | 7/1897 | Fed. Rep. of Germany | 74/351 |
| 0096337 | 3/1898 | Fed. Rep. of Germany | 74/351 |
| 0954857 | 1/1950 | France | 74/351 |
| 0003308 | 11/1897 | United Kingdom | 74/351 |

*Primary Examiner*—Dirk Wright
*Assistant Examiner*—Harold F. Macris
*Attorney, Agent, or Firm*—Charles R. Engle

[57] ABSTRACT

A speed changing mechanism operable during both kinetic and static conditions. A gear 28 driven by bicycle pedals 30 in turn drives gear 32. Holes 38 in the face of the latter gear are engaged by gear 64 which is integral with output shaft 42. One end 72 of the output shaft is loosely supported in cup 78 whereby the shaft may be laterally shifted, then axially shifted so that gear 64 is withdrawn from one set of the holes 38, then reengaged with another set of the holes 38.

7 Claims, 3 Drawing Sheets

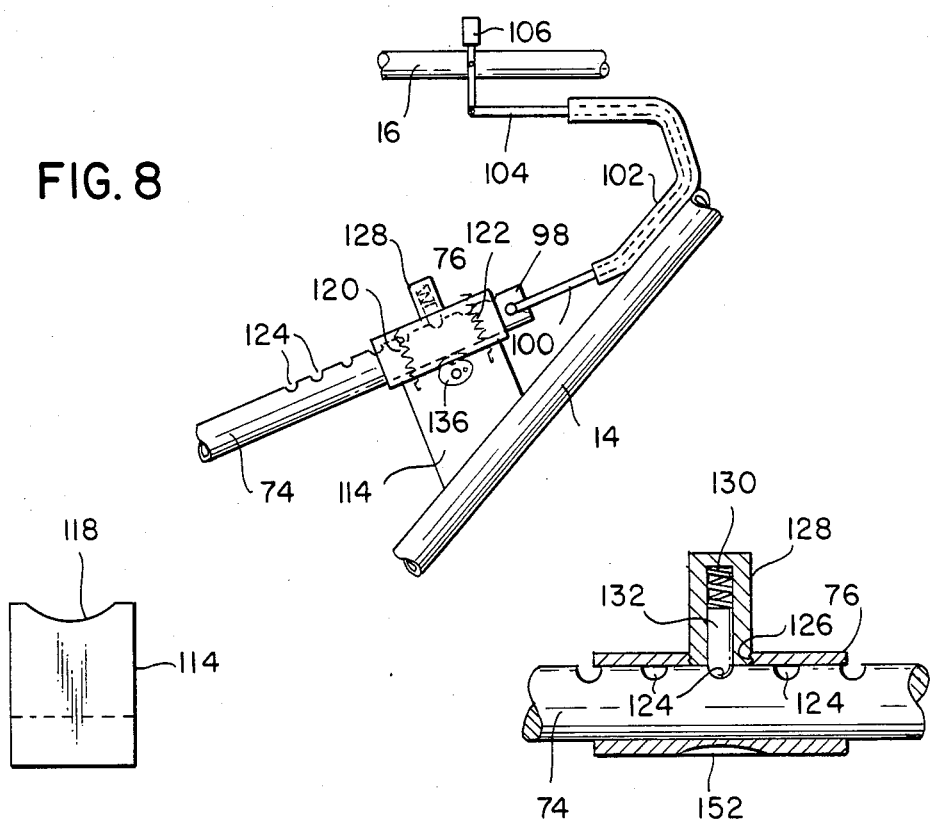
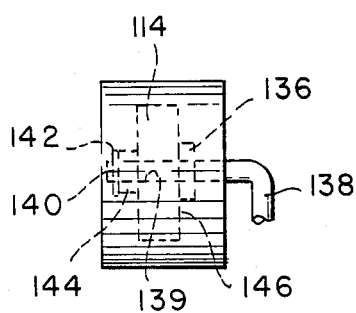
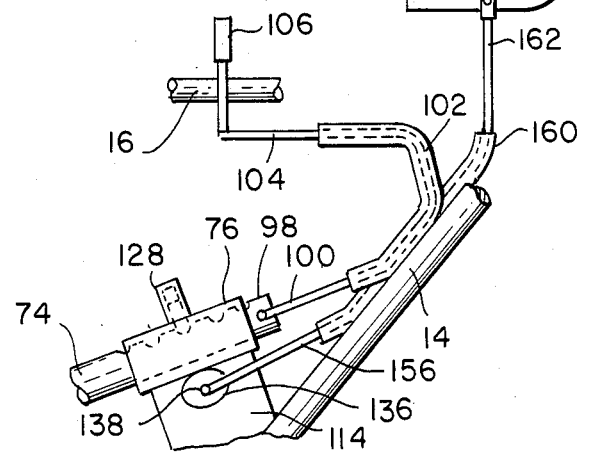
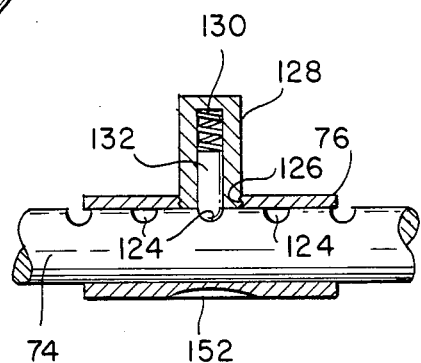
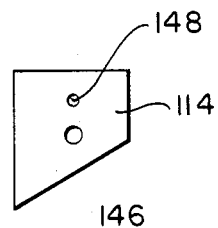
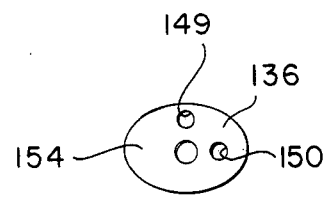
FIG. 8
FIG. 9
FIG. 10
FIG. 11
FIG. 12
FIG. 13
FIG. 14

4,813,302

SPEED CHANGING MECHANISM

FIELD OF THE INVENTION

This invention relates to a speed-changing mechanism that can be operated while a device is either in a kinetic or static condition. More particularly, the invention relates to a speed-changing mechanism of relatively simple construction and one that has particular application in relatively light power transmitting circumstances such as a drive arrangement in a bicycle.

BACKGROUND OF THE INVENTION

Over the past few years, dramatic increases in the cost of materials and labor have focused attention upon methods of reducing costs in various types of industrial and commercial devices. In the area of power transmission, it is usual that complex structures will be utilized to satisfy a relatively low torque transmission requirement. Recently industry has been concerned with production of transmission assemblies including utilization of stamped components. These structures, however, continue to be of complex construction including numerous components. Consequently, any malfunction within the device necessarily requires substantial time and possible expenditure of substantial sums toward replacement parts in putting the device back into an operable condition.

Change speed mechanisms currently used in bicycles are a specific area where the speed-changing device is of a complex nature. The usual three-speed, ten-speed, twelve speed, or eighteen speed shfting structure includes a plurality of sprockets in combination with a relatively sensitive shifting mechanism. The number of individual components in these devices is likewise substantial and repair necessarily involves expenditure of considerable time and money toward replacing a defective component somewhere in the mechanism. A further disadvantage resides in the fact that these bicycle change speed devices can only be operated while the bicycle is in motion, thus preventing a change in a stopped or static condition.

SUMMARY OF THE INVENTION

Accordingly, an object of this invention is the provision of a simple speed-changing mechanism having particular application in low torque transmitting applications.

Another object of this invention is the provision of a speed-changing mechanism permitting speed changes during kinetic conditions.

Still another object of this invention is the provision of a speed-changing mechanism incorporating a minimum number of moving parts while providing a relatively wide range of speed ratios.

Yet another object of this invention is the provision of a speed-changing mechanism incorporating a simply constructed control arrangement that is easily operated to effect changes in speed ratios.

It is another object of this invention to provide a speed-changing mechanism wherein only one power transmitting member is moved to effect speed changes.

Another object of this invention is the provision of a control means that is adjusted to selected positions and positively locked at such positions providing a predetermined speed ratio.

To achieve these objects, in accordance with the purposes of the invention, as embodied and broadly described herein, the speed-changing mechanism comprises driving means receiving torque from an input source, driven means connected to adjustable power transmitting means, the driven means including a plurality of friction driving means selectively engaged establishing a particular speed ratio, adjustable power transmitting means being in engagement with the driven means and adjustable to engage one of the plurality of speed ratios of the friction driving means, and control means operable to shift an adjustable portion of the power transmitting means into engagement with a particular friction driven means establishing the speed ratio, and latching detent means for retaining the shiftable power transmitting means in a selected position.

The accompanying drawings, which are incorporated and constitute a part of the specifications, illustrate an embodiment of the invention and, together with the description, serve to explain the principles of the invention.

BRIEF DESCRIPTION OF THE DRAWINGS

FIG. 8 is a fragmentary view of the speed ratio adjusting mechanism of my invention, with the adjusting mechanism rotated 90 degrees for purposes of illustration.

FIG. 9 is an end view of the block supporting the adjusting mechanism of my invention.

FIG. 10 is a fragmentary view, partly in section, showing a detent locking device retaining the speed-changing mechanism in an adjusted position.

FIG. 11 is a plan view illustrating a drive disengaging means of my invention.

FIG. 12 is a side view of the adjusting mechanism supporting block.

FIG. 13 is a side view of a drive disengaging cam incorporated in my invention.

FIG. 14 is a plan view of actuating mechanisms respectively operable to disengage the drive connection and adjust speed ratios.

DETAILED DESCRIPTION OF THE PREFERRED EMBODIMENT

Figure 1:
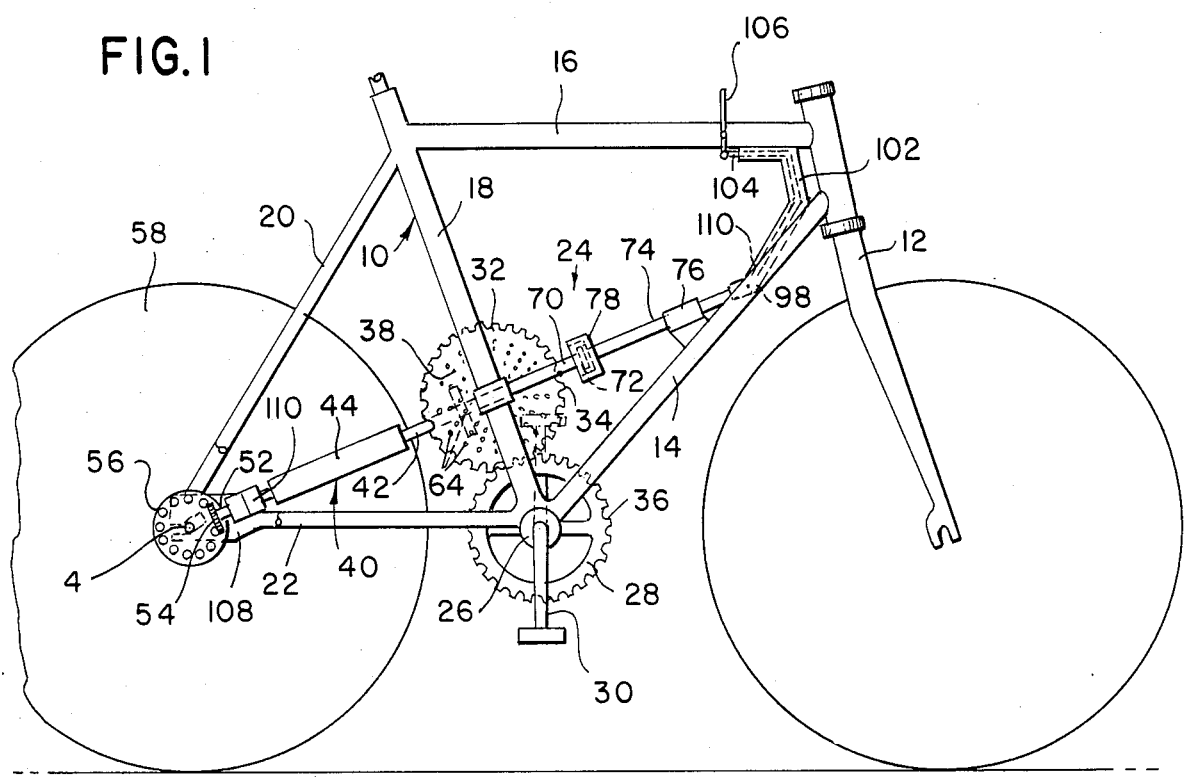
FIG. 1 is a plan view of the speed-changing mechanism of my invention illustrated in an assembled condition.
Figure 3:
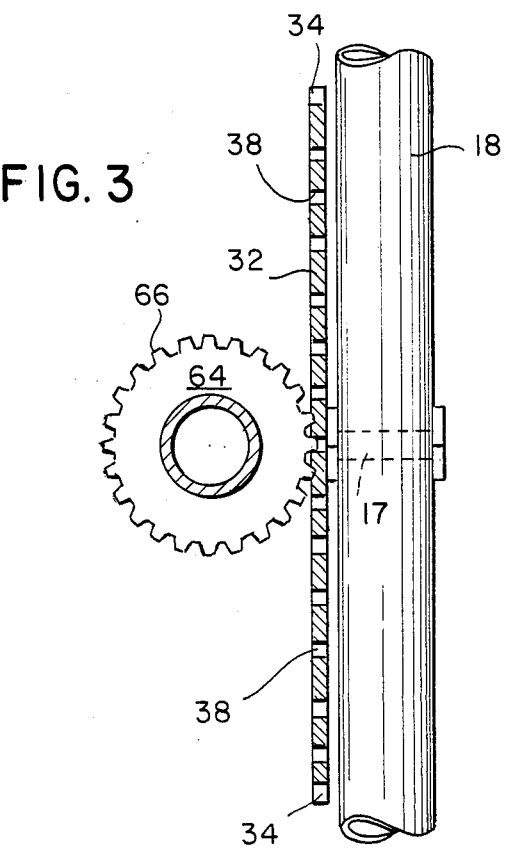
FIG. 3 is a fragmentary plan view of the shiftable power transmitting means in engagement with the driven means of my invention, which is shown on one side for purposes of illustration only as the power transmitting means may be mounted on either side of the bicycle frame.

With reference to FIG. 1, a conventional bicycle frame, including a front fork 12 and frame members 14, 16, 18, 20, and 22 is shown supporting a speed changing mechanism 24. Frame members 14, 18 and 22 are joined together at hub 26 which rotatably supports a conventional gear driving means 28 and an input power source in the form of pedal assembly 30. A speed changing gear driven means 32 is rotatably mounted on shaft 17 secured to frame member 18, as best shown in FIG. 3, so that teeth 34 are in continual engagement with teeth 36 of the conventional sprocket driving means 28. The driven means gear 32 contains a plurality of friction driving means comprising circumferentially spaced holes 38 located on the circumference of respective circles of varying radii, as best shown in FIG. 3.

Figure 2:
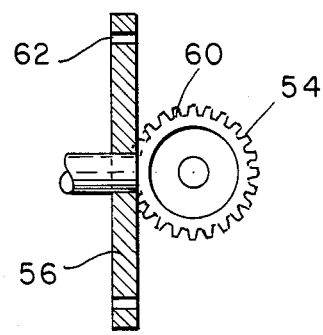
FIG. 2 is a side view of a constant output drive connection of the speed-changing mechanism illustrating a lateral relationship of the driving components of my invention.
Figure 7:
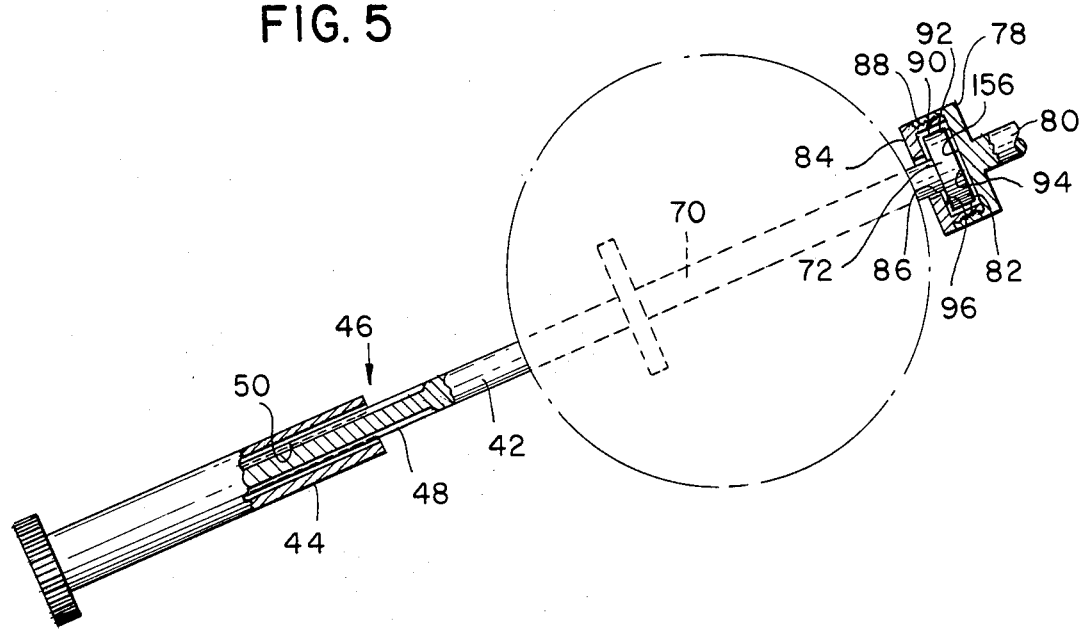
FIG. 7 is a plan view illustrating the adjusting mechanism permitting selective changes in speed ratios.

An adjustable power transmitting means 40 includes a torque transmitting rod 42 axially slidably received within tubular member 44 and drivingly connected thereto by a splined connection 46, as shown in FIG. 7. The adjustable power transmitting means 40 and its associated mechanisms can be mounted on either side of the bicycle frame. The rod 42 has a male splined area 48 while the tubular member 44 contains a female splined area 50. Tubular member 44 has an integral rod portion 52 which supports a fixed power output gear 54 that is in continual engagement with driven disc 56 in turn affixed to a conventional bicycle wheel 58, best illustrated in FIG. 1. Power output gear 54, as shown in FIG. 2, has teeth 60 continually engaged with circumferentially spaced holes 62 in driven disc 56 providing a driving connection therebetween.

Rod 42 has an affixed driving gear 64 which includes teeth 66 in engagement with selected spaced holes 38 of a predetermined circumference on gear 32. The engagement of teeth 66 with holes 38 can obviously be designed to permit pivotal movement of the teeth into and out of the holes 38 while providing a driving connection when placed in a selected position. Rod 42 also includes an extended portion 70 terminating in an enlarged integral flat circular head portion 72.

A non-rotating axially moveable adjusting member 74 is slidably mounted within a locking bushing 76. A cup-shaped connector 78 is integral with or otherwise connected to one end 80 of member 74. The cup connector 78, in preferred form, includes a threaded area on its internal surface 82 as shown in FIG. 7. A cylindrical cap number 84, containing an aperture 86, and generally in the form of a cup, has an area 88 of a reduced diameter that contains an external threaded area 90 permitting the securing of cap 82 to connector 78 forming a non-rotating cavity 92 as is also shown in FIG. 7. The respective inner surfaces 94 and 96 of these members are coated with TEFLON or other suitable friction reducing material so that head 72 may rotate within the static cavity 92 with minimal frictional resistance to rotation of rod 42.

With reference now to FIG. 8, the other end 98 of adjusting member 74 is connected to a control means including flexible cable 100, which can be extended and retracted within a guide tube 102. Remote end 104 of cable 100 is connected to a control lever 106 pivotally mounted on frame member 16.

Figure 4:
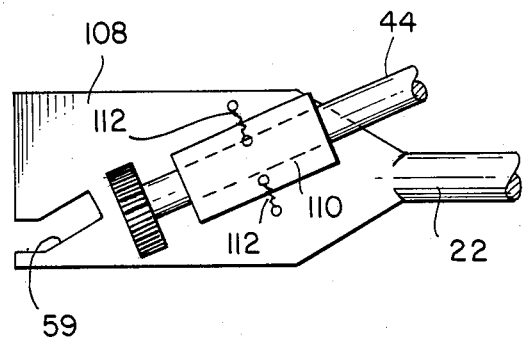
FIG. 4 is a fragmentary plan view illustrating pivotal mounting of a component gear of the constant output drive connection incorporated in my invention.
Figure 5:
FIG. 5 is a fragmentary view, partly in section, illustrating a fixed bearing component of the pivotal mounting of the component gear shown in FIG. 4.
Figure 6:
FIG. 6 is an end view of the fixed bearing shown in FIG. 5.

The mounting of speed changing mechanism 24 on bicycle frame 10 will now be described with particular reference to FIG. 4. Frame member 22 includes a relatively large flat end portion 108 facilitating securing wheel 58 to the frame in slots 59. The portion 108 supports a sleeve bearing 110 retained upon the flat portion 108 by springs 112 also shown in FIG. 4. The bearing 110 and springs 112 cooperate forming a resilient mounting means for the bearing 110.

Adjusting member 74 is resiliently supported upon frame 14 in a manner best illustrated in FIG. 8. A supporting block 114 is welded or otherwise secured to frame member 14 in a position extending substantially lateral to the position shown in FIG. 8, which is for purposes of illustration only. Obviously block 114 has to be placed so that gear 64 can engage the friction driving holes 38 in gear 32. A sleeve locking bushing 76 is drawn into engagement with a concave surface 118 of block 114 and is resiliently held in place by a predetermined force applied by springs 120 and 122, connected to the block 114 and the sleeve locking bushing 76. The springs 120, 122 and block 114 cooperate forming a resilient locking bushing supporting means. Adjusting member 74 contains a plurality of positioning recesses 124 spaced at distances equal to the respective radii of the circumferentially spaced holes 38 in gear 32.

With reference to FIG. 10, sleeve locking bushing 76 contains an aperture 126 threadably receiving a detent housing 128. Detent housing 128 contains a spring 130 biasing detent 132 into continual engagement with adjusting member 74. The detent 132 engages a recess 124 and releasably secures member 74 in a particular selected position through such engagement.

Referring to FIG. 14, a drive disengaging means includes a cam 136 affixed upon a rod 138 rotatably supported in aperture 139 of the block 114, as shown in FIG. 11. Rod end 140 supports a fixed washer 142 which is continually biased away from supporting block 114 by a spring 144 causing cam 136 to be in rubbing contact with side surface 146 of the block 114. A detent 148, in the form of a small rounded protusion, is integral with surface 146 as shown in FIG. 12. The cam 136 contains two recesses 149 and 150, spaced 90 degrees apart, as shown in FIG. 13, for holding the cam in either of two rotated positions. As shown in FIG. 10, sleeve locking bushing 76 contains an arcuate slot 152, receiving portion 154 of cam 36 when it is rotated into engagement with the sleeve locking bushing 76.

A remote drive disengaging means is shown in FIG. 14. An actuating cable 156 has one end attached to a cam 136 at 158 and is slidably mounted within guide tube 160. The other end 162 of cable 156 is connected with an actuating lever 164, which is pivotally mounted on handle bar 166 at 168.

In operation, a bicycle rider actuates gear driving means 28 through pedal assembly 30 rotating gear driven means 32 and driving gear 64, which is in engagement with the gear 32 in a preselected series of the circumferentially spaced holes 38 at a particular radius on the gear 32. The specific engagement provides a predetermined desired speed ratio. Rotation of driving gear 64 in turn rotates rod 42, which in turn, rotates tubular member 44 through the splined connection 46, as illustrated in FIG. 7. Rod portion 52 of the tubular member 44 rotates within sleeve bearing 110 actuating driven gear 54 which is in continual engagement with disc 56 by virture of teeth 60 engaging circumferentially spaced holes 62 located on a predetermined radius of the disc 56, as best illustrated in FIG. 2. Rod 42 rotates driving gear 64 and its extended portion 70 terminating in the integral flat circular head portion 72 best illustrated in FIG. 7. The head 72 is secured within the cavity 92 formed by cup members 78 and 84 threadedly fastened together. Since the respective inner surfaces 94 and 96 of cup-connector 74 and cap member 84 are coated with TEFLON or suitable friction reducing material, the head 72 freely rotates within the cavity 92 on the end 80 of the non-rotating adjusting member 74. The non-rotating adjusting member 74 is slideably received within bearing 76 and is actuated axially relative to the bearing by lever 106 extending and retracting control cable 100.

When the bicycle operator decides to change to a different speed ratio, the lever 138 is rotated 90 degrees, which in turn rotates cam 136 ninety degrees placing recess 150 in alignment with detent 148 on supporting block 114. This causes a greater diameter of the cam and its surface 154 to engage slot 152 in sleeve locking bushing 76 forcing the speed changing assembly 40 outwardly from gear 32 disengaging driving gear 64 and its teeth 66 from the holes 38 in the gear. This permits axial movement of the driving gear 64 through the spline connection 46 as the male splines 48 on rod 42 move relative to the internal splines 50 on tubular member 44. The lever 106 is moved to position driving gear at a particular predetermined distance in alignment with holes 38 at a predetermined radii on the sprocket and the cam lever 138 is again rotated 90 degrees so that recess 149 engages detent 148 and the cam surface 154 is removed from engagement with slot 152. The springs 120 and 122 contract drawing sleeve locking bushing 76 into concave surface 118 on block 114 returning the driving gear 64 to a normal driving position in engagement with the friction driving holes 38. Rod portion 52 of the tubular member 44 and sleeve bearing 110 pivot against the force of springs 112 while teeth 60 of gear 54 remain in engagement with holes 62 in disc 56 during the axial adjustment of driving gear 64. It is significant that the support member 114 is positioned on frame member 14 in a specific location so that rotation of the cam is effective to move driving gear 64 out of engagement with the gear 32 during speed changes.

It should be noted that rotation of lever 106 moving gear 64 to a new speed ratio position results in detent 132 being cammed out of one of the recesses 124 against the force of spring 130. Axial movement of adjusting member 74, the configuration of recesses 124, and the force of spring 130 are all predesigned and cooperate to permit the detent 132 to cam out of the recesses 124. Of course, upon reaching a new speed ratio position, the spring 130 moves detent 132 into engagement with a recess 124 with a frictional force sufficient to retain adjusting member 74 in the newly selected position. Obviously, the recesses 124 are spaced to match the spacing of the varying circumferentially spaced holes in gear 32.

When the actuating mechanisms, illustrated in FIG. 14, is used, the rider rotates lever 164 ninety degrees moving cable 156 so that cam surface 154 engages arcuate slot 152 and moves the locking bushing 76 outwardly disengaging driving gear 64. Likewise, after the speed ratio is changed by repositioning gear 64, the lever 164 is rotated back to its former position and gear teeth 66 are re-engaged with holes 38 in gear 32.

From the above description it is apparent that this invention provides a speed change mechanism which is easily attached to a conventional bicycle frame, as a preferred example, and provides a particular significant advantage in that speed changes can be made both while the bicycle is in motion and while it is not in motion.

It will be apparent to those skilled in the art that various modifications and variations can be made in the structure of the speed changing mechanism of the present invention without departing from the scope or spirit of the invention. For example the actuating mechanism including the cable 100 can be in the form of an hydraulic system wherein the rod 42 could be adjusted by movement of a fluid responsive piston and clearly be within the scope of this invention. Thus it is intended that the present invention cover the modifications and variations of this invention provided they come within the scope of the appended claims and their equivalents.

I claim:

1. A speed changing mechanism capable of effecting speed changes during both kinetic and static conditions comprising:
   a power input gear;
   a driven gear;
   a frame member;
   said input and said driven gears being mounted upon said frame upon separate, parallel axes so that the gears mesh with each other;
   a plurality of sets of spaced holes on the driven gear, each one of said sets of said holes being arranged along the circumference of a circle whose center is the center of the driven gear, so that the circle of each one of said sets of said holes is concentric to the other circles of the other of said sets of said holes;
   adjustable means for transmitting power;
   driving means located on said adjustable means for engaging said holes;
   an output member;
   driven means for rotating said output member;
   said adjustable member movable to engage said driving means with a selected one of said sets of said holes for establishing a speed ratio unique to the selected one of said sets.

2. A speed changing mechanism as described in claim 1 wherein said adjustable means comprises telescoping members, one of which is movable relative to the other for selectively connecting said driving means on said adjustable means with one of said sets of holes for establishing said speed ratio.

3. A speed changing mechanism as described in claim 1 further comprising a gear for disengaging said driven means on said adjustable means from said plurality of sets of said holes while a speed ratio change is being made.

4. A speed changing mechanism as described in claim 1 wherein said adjustable means includes a rotating to a non-rotating connection permitting axial adjustment of said adjustable means while a portion thereof continues to rotate.

5. A speed changing mechanism as described in claim 1 further comprising a latching means securing said adjustable means in a position corresponding to said selected speed ratio.

6. A speed changing mechanism as described in claim 3 wherein said disengaging means includes a cam actuatable to move said adjustable means away from said plurality of said sets of said holes thereby disconnecting and permitting axial adjustment of said adjustable means.

7. A speed changing mechanism capable of effecting speed changes during both kinetic and static conditions comprising:
   a power input gear;
   a driven gear;

a plurality of sets of spaced holes on the driven gear, each one of said sets of said holes being arranged along the circumference of a circle whose center is the center of the driven gear, so that the circle of each one of said sets of said holes is concentric to the other circles of the other of said sets of said holes, each of said sets forming a driving connection;

a tubular member;

a female splined area of the inner surfaces of one end of said tubular member;

a power gear affixed to the other output end of said tubular member;

a sleeve bearing rotatably supporting said tubular output end;

a plurality of springs resiliently supporting said output end while permitting limited pivotal movement thereof and retaining said power gear in a drivingly connected position;

a rod member extending across the diameter of said driven gear and terminating in ends substantially beyond on both sides;

a male splined area on the exterior surface of one end of said rod member engaging said female splined area of said tubular member;

a gear affixed to said rod member intermediate said ends and having teeth configured for engaging said driven gear holes;

an enlarged flat circular head portion on the other end of said rod member;

a non-rotating adjusting rod;

a cup-shaped member affixed on one end of said adjusting rod rotatably receiving said circular head portion;

means retaining said rotating head portion within said nonrotating cup-shaped member;

a locking bushing slidably receiving said non-rotating rod;

a plurality of locking recesses in said non-rotating rod at predetermined spaced intervals;

a spring biased detent secured in said locking bushing, said detent being biased into engagement with one of said rod recesses when a particular speed ratio is selected;

a bushing supporting block;

a plurality of springs resiliently retaining said locking bushing on said block;

a cam rotatably mounted on said support block, said cam engaging said locking bushing when rotated to a disengaging position;

first control means operable to rotate said cam into engagement with said locking bushing moving it to disengage said power transmitting gear from one of said driving connections;

and second control means operable to move said non-rotating rod and said rotating rod member axially relative to and within said tubular member through said splined connection positioning said power transmitting gear in a selected speed ratio position in alignment with a different one of said driving connections on said driven gear whereby movement of said cam out of engagement with said locking bushing by said first control means engages said power transmitting gear with said different one of said driving connections;

said locking detent being cammed outwardly, against its biasing spring force, during axial movement of said rod members removing it from one recess in said non-rotating rod and being reseated in another recess by said spring force upon the establishment of the newly selected speed ratio.

* * * * *